(12) United States Patent
Kaiser et al.

(10) Patent No.: US 12,240,309 B2
(45) Date of Patent: Mar. 4, 2025

(54) MOBILE HOME

(71) Applicant: Erwin Hymer Group SE, Bad Waldsee (DE)

(72) Inventors: Ria Kaiser, Hamburg (DE); Ole Kasten, Stade (DE); Mathis Wulf, Stade (DE)

(73) Assignee: Erwin Hymer Group SE, Bad Waldsee (DE)

( * ) Notice: Subject to any disclaimer, the term of this patent is extended or adjusted under 35 U.S.C. 154(b) by 889 days.

(21) Appl. No.: 17/269,726

(22) PCT Filed: Aug. 22, 2019

(86) PCT No.: PCT/EP2019/072537
§ 371 (c)(1),
(2) Date: Dec. 7, 2021

(87) PCT Pub. No.: WO2020/039053
PCT Pub. Date: Feb. 27, 2020

(65) Prior Publication Data
US 2022/0089010 A1 Mar. 24, 2022

(30) Foreign Application Priority Data
Aug. 22, 2018 (DE) ..................... 10 2018 120 528.7

(51) Int. Cl.
*B60K 1/04* (2019.01)
*B60L 50/60* (2019.01)
*B62D 21/02* (2006.01)
*B62D 59/04* (2006.01)
*B62D 63/06* (2006.01)
*B62D 63/08* (2006.01)

(52) U.S. Cl.
CPC ................ *B60K 1/04* (2013.01); *B60L 50/66* (2019.02); *B62D 21/02* (2013.01); *B62D 59/04* (2013.01); *B62D 63/062* (2013.01); *B62D 63/08* (2013.01); *B60K 2001/0438* (2013.01); *B60L 2200/28* (2013.01)

(58) Field of Classification Search
CPC ............ B60K 2001/0438; B60L 50/66; B60L 2200/28
See application file for complete search history.

(56) References Cited

U.S. PATENT DOCUMENTS 5,392,873 A * 2/1995 Masuyama ............. B60L 50/64
180/68.5
5,559,420 A * 9/1996 Kohchi ................... B60L 50/66
280/492

(Continued)

FOREIGN PATENT DOCUMENTS

DE 102013001766 A1 7/2014
DE 102016214171 A1 2/2018

*Primary Examiner* — Jeffrey J Restifo
(74) *Attorney, Agent, or Firm* — Dinsmore & Shohl LLP

(57) ABSTRACT

In the case of a travel trailer having a battery and an axle (13) or a tandem axle, the battery (9) is designed for supplying electricity to a travel drive of a towing vehicle and/or to an optional travel drive of the travel trailer during trailer travel in road traffic, and is arranged as a flat battery (9) below a floor of the travel trailer, in a vehicle frame (1), wherein the height of the battery (9) essentially corresponds to the height of the vehicle frame (1).

18 Claims, 2 Drawing Sheets

(56) References Cited

U.S. PATENT DOCUMENTS

| | | | | |
|---|---|---|---|---|
| 6,571,542 B1* | 6/2003 | Fillman | | B60L 50/66 |
| | | | | 56/10.2 A |
| 7,514,803 B2* | 4/2009 | Wilks | | B60L 53/80 |
| | | | | 322/1 |
| 8,627,908 B2* | 1/2014 | Wellborn | | B60L 15/42 |
| | | | | 701/96 |
| 8,789,635 B2* | 7/2014 | Franzen | | B60L 15/38 |
| | | | | 180/68.5 |
| 9,321,357 B2* | 4/2016 | Caldeira | | B60L 50/53 |
| 9,457,666 B2* | 10/2016 | Caldeira | | B60D 1/64 |
| 9,857,255 B2* | 1/2018 | Hagan | | B60L 58/20 |
| 9,887,570 B2* | 2/2018 | Johnsen | | B60L 53/14 |
| 10,245,972 B2* | 4/2019 | Healy | | B60L 8/003 |
| 10,309,871 B2* | 6/2019 | Hagan, Jr. | | B60W 10/04 |
| 10,500,975 B1* | 12/2019 | Healy | | B60K 6/48 |
| 10,596,913 B2* | 3/2020 | Healy | | B60L 15/2018 |
| 10,899,214 B2* | 1/2021 | Sloan | | B62D 25/088 |
| 11,043,707 B2* | 6/2021 | Sloan | | H01M 50/249 |
| 11,046,192 B2* | 6/2021 | Aufdencamp | | B60L 50/60 |
| 11,351,979 B2* | 6/2022 | Richter | | B60K 6/52 |
| 11,712,977 B2* | 8/2023 | Bucknor | | B60L 53/53 |
| | | | | 180/2.1 |
| 11,712,979 B2* | 8/2023 | Jung | | B60L 50/64 |
| | | | | 180/68.5 |
| 11,926,207 B2* | 3/2024 | Mckibben | | B60L 58/21 |
| 2009/0315338 A1* | 12/2009 | Ylvisaker | | B60L 8/00 |
| | | | | 290/1 R |
| 2011/0042154 A1 | 2/2011 | Bartel | | |
| 2011/0114398 A1* | 5/2011 | Bianco | | B60K 1/04 |
| | | | | 320/109 |
| 2012/0273285 A1* | 11/2012 | Jensen | | B60K 7/0007 |
| | | | | 180/65.1 |
| 2016/0318421 A1 | 11/2016 | Healy | | |
| 2022/0089010 A1* | 3/2022 | Kaiser | | B62D 21/02 |
| 2022/0089235 A1* | 3/2022 | Kasten | | B62D 59/04 |
| 2022/0105814 A1* | 4/2022 | Metzler | | B60L 15/20 |
| 2022/0324527 A1* | 10/2022 | Mast | | B60L 15/20 |
| 2023/0271508 A1* | 8/2023 | Healy | | B60L 1/02 |
| | | | | 180/2.2 |
| 2023/0347772 A1* | 11/2023 | Ikushima | | B60L 53/62 |
| 2024/0067005 A1* | 2/2024 | Javidan | | B60L 53/38 |
| 2024/0067283 A1* | 2/2024 | Javidan | | B60T 13/36 |

* cited by examiner

MOBILE HOME

CROSS-REFERENCE TO RELATED APPLICATIONS

This application is the United States national phase of International Application No. PCT/EP2019/072537 filed Aug. 22, 2019, and claims priority to German Patent Application No. 10 2018 120 528.7 filed Aug. 22, 2018, the disclosures of which are hereby incorporated by reference in their entirety.

BACKGROUND OF THE INVENTION

A camper or travel trailer is a trailer for a motor vehicle, in which suitable equipment for persons to live and stay in it is installed. Such a travel trailer is conventionally pulled as a trailer in road traffic, without any drive of its own, purely by means of the towing vehicle. Generally, this is a single-axle trailer or a trailer having a tandem axle.

Increasingly, hybrid vehicles are being used as motor vehicles; their drive consists of a combination of an internal combustion engine with an electric drive. In this regard, the electric drive can be used in such a manner that it works in addition to the internal combustion engine and is turned on when increased power is required during acceleration phases or when traveling uphill on an incline. For example, during such operation the electric drive obtains its energy from an electric energy storage unit, in particular a battery, which is charged during uniform travel operation or during regenerative braking.

Furthermore, there are increasingly entirely electric vehicles, which obtain their energy from an energy storage unit, i.e. a battery, and are driven by way of electric motors.

If such vehicles tow a trailer, a marked reduction in range occurs in the case of an entirely electric vehicle, and in the case of hybrid vehicles, it can lead to the result that the required additional power of the electric drive is not available for a sufficiently long period of time, since the battery is exhausted.

This holds true to a particular degree for travel trailers towed by passenger cars, which are not purchased by their buyers with consideration for a great towing load, and when towing a trailer often utilize their full towing load capacity, to a great extent, in comparison with an SUV or an all-terrain vehicle, for example. Furthermore, travel trailers have great air resistance by their nature, due to their high construction, and therefore cause a markedly increased fuel consumption or energy consumption of the towing vehicle in towing operation.

It is known in the state of the art, for other trailers, to equip them with a battery or an energy supply unit for producing electricity, so as to supply the towing vehicle with energy or so as to contribute to the forward movement by way of driven wheels of the trailer. In the case of electric vehicles, such trailers are also referred to as Range Extenders that increase the range. In the case of electric vehicles, for example, in long-distance operation, such trailers can significantly increase the range.

For example, an energy trailer for a hybrid vehicle is known from DE 41 21 386 A1, in which an internal combustion engine having a generator, on the energy trailer, produces electricity. A trailer having batteries that are arranged above the trailer axle is known from DE 44 11 844 A1, and also from EP 0 040 111 A1.

In travel trailers, batteries are known for equipment and devices of the interior furnishings or for maneuvering drives with which a trailer can be moved into its position on the campground, for example. The size and capacity of these batteries, in particular, are therefore not designed for travel drive during trailer operation in road traffic.

Modern batteries can be used as batteries for such trailers; these can be referred to as high-performance batteries and have a greater energy density with regard to weight and/or volume as compared with lead batteries. This energy density is above and outside of the corresponding values for lead batteries. Aside from the slightly lighter nickel-cadmium batteries, these are, for example, nickel-hydrogen, nickel-iron, nickel-zinc, nickel-metal hydride and silver-zinc, as well as sodium-nickel chloride and sodium-sulfur batteries. Lithium ion batteries are the most commonly used.

With reference to a travel trailer, it is important for such batteries to arrange them advantageously. An increase in construction height is supposed to be avoided. Furthermore it is desirable that the arrangement is advantageous with reference to the distribution of the center of gravity, since these are single-axle trailers that have a support load on the coupling that must remain within certain limits. Finally, it must be taken into consideration that the battery must be arranged with a certain protection, since the great energy density of high-performance batteries can release great amounts of energy if they are damaged and during short-circuits caused by such damage.

SUMMARY OF THE INVENTION

The present invention is based on the task of making available a travel trailer having batteries to increase the range when the trailer is towed, in particular using hybrid or electric vehicles, with which trailer the aforementioned disadvantages are avoided, and which trailer offers an advantageous and safe arrangement of the batteries.

The task is accomplished, according to the invention, in that in the case of a travel trailer having a battery and one axle or a tandem axle, the battery is designed for supplying power to a travel drive of a towing vehicle and/or an optional travel drive of the travel trailer during trailer operation in road traffic, and is arranged as a flat battery under a floor of the travel trailer, wherein the height of the battery essentially corresponds to the height of the vehicle frame.

In this regard, the floor of the travel trailer corresponds to the floor of the interior, on which persons walk. In total, the structure is therefore very flat and low, and in comparison with a conventional travel trailer, no additional construction height is required, and therefore the air resistance also does not increase. In this regard, the battery is designed for making electricity available for an additional travel drive. If, for example, a usual starter battery of a motor vehicle having an internal combustion engine can store a capacity of maximally approximately 100 Ah and thereby theoretically an energy of maximally approximately 1.2 kWh at 12 V, the battery of the travel trailer according to the invention has a significantly greater energy density. This can involve values of more than 50 kWh, for example. By way of a suitable cable connection, this current can be supplied to a towing electric vehicle to increase its range, or to a hybrid vehicle, so that the latter can tow the travel trailer for a longer time with the combined drive. The center of gravity of the chassis of the travel trailer lies lower, and an improvement occurs in the dynamic travel behavior of the trailer. Due to the low center of gravity, the dynamic support load shift during acceleration and, above all, during braking is advantageously reduced. The total center of gravity of the travel trailer actually lies lower, in total, as compared with a conventional one, since the total center of gravity is relatively high without the battery. In this regard, the battery has a flat structure and a construction height approximately at the level of the chassis frame or vehicle frame. The battery can be a rechargeable battery. However, fundamentally it is also conceivable that other types of electric energy storage units are used in all of the variants described below and in the exemplary embodiment, such as double-layer capacitors, for example.

In an advantageous embodiment, the battery is divided up into a front battery and a rear battery, with the axle or tandem axle being arranged between them.

A division into more than two battery parts is also conceivable. This results in smaller units that are easier to handle during production.

At least one transverse beam and/or at least one axle element, for example a torsion tube, can be arranged between the front battery and the rear battery.

This allows a desired transverse reinforcement at the level of the axle, by means of which forces are introduced into the frame. In particular, it is possible to provide axle suspension elements that extend over the entire width of the travel trailer, such as a torsion tube of a twist-beam axle.

It is advantageous if the front battery and the rear battery are positioned, with regard to a point of rotation of the travel trailer about its axle, in such a manner that a desired support load or a symmetrical weight distribution about the point of rotation exists.

Due to the division into a front battery and a rear battery, each designed as a rechargeable battery, these can be arranged neutrally with regard to a point of rotation of the travel trailer. For example, a neutral load moment or an intentional load moment can be established by means of the position and thereby by means of the lever arm relative to the point at which the wheels of the travel trailer make contact with the ground, depending on the lever arm of the center of gravity of the battery part. In this way, it is possible to balance out imbalances specific to the structure, without having to use additional ballast such as weights, filled water tanks, etc. In this regard, it is conceivable that one or both batteries are mounted in one specific position or multiple possible positions during production of the travel trailer, as a function of the structure and other circumstances. By avoiding ballast weights, it is possible to avoid unnecessary weight and to maximize the permissible additional load.

In a further development, the vehicle frame can consist of outer longitudinal beams that run in the longitudinal direction of the vehicle, and an inner frame composed of inner beams that run in the longitudinal direction of the vehicle, wherein the battery is arranged in the inner frame, between the inner beams.

This arrangement protects the battery by means of the additional inner frame as well as by the greater lateral distance. In the event of an accident, the battery only needs to absorb a small amount of energy and is damaged less quickly. This is particularly advantageous in the case of high-performance batteries such as a lithium ion battery, for example, which have very great energy density, the release of which must be prevented if at all possible in the event of an accident. Construction space is available between the outer longitudinal beams and the inner beams for the installation of further components, for example water tanks. Here, assemblies can also be provided in the case of drive of the wheels of the travel trailer with electric motors, as can performance electronics, cooling bodies, and the like. Additional protection of the battery, which is arranged farther inward, in the event of an accident also results from these components.

The inner frame can consist of parallel standard profiles, in particular open profiles.

This parallel arrangement of the inner beams, in particular if these are formed from open standard profiles, offers the possibility of making standardized frames available. As needed, the battery or the battery parts can be variably inserted into these frames and screwed in place. In particular, it is also possible to react to the load distribution of the structure of the travel trailer in this way, and an adaptation for different models can occur during production. This results in a greater freedom of design in the planning and the design of the travel trailer and the interior furnishings.

It is advantageous if the inner beams are connected with transverse beams at their front and rear ends, the latter being arranged between the outer longitudinal beams.

A reinforcing effect results from the inner beams and the inner frame, and the outer longitudinal beams of the vehicle frame can be designed to be lighter. Also, the floor on which persons stand and walk can be designed to be lighter, since only shorter self-supporting lengths occur.

One or more transverse beams can be arranged in front of and/or behind the battery or battery parts.

In that a transverse beam is provided on the front side and rear side of each battery part, the battery can be suspended in this way. In this alternative embodiment, no inner beam is necessary, and the battery is held and mounted solely on the transverse beams. These transverse beams can be directly attached to the outer longitudinal beams of a vehicle frame, for example.

The battery can be a high-performance battery, in particular a rechargeable lithium ion battery.

In a further embodiment, the wheels of the travel trailer can have electric drive motors, which can be supplied with electricity from the battery.

This results in a simplified structure as compared with transmission of the electric power to a towing electric vehicle, in that the travel trailer has practically no or only a greatly reduced drag resistance, so that the range can be increased.

It is conceivable to use the characteristics described above for a travel trailer also in the case of a trailer, in general. In particular, the characteristics indicated in the claims for a travel trailer can be provided, in the case of each individual one of the claims and independent of the characteristics of other dependent claims, also for a trailer in general. In this regard, the battery should be provided below a floor of the trailer, in particular a loading space floor, for example.

DESCRIPTION OF THE INVENTION

Figure 1:
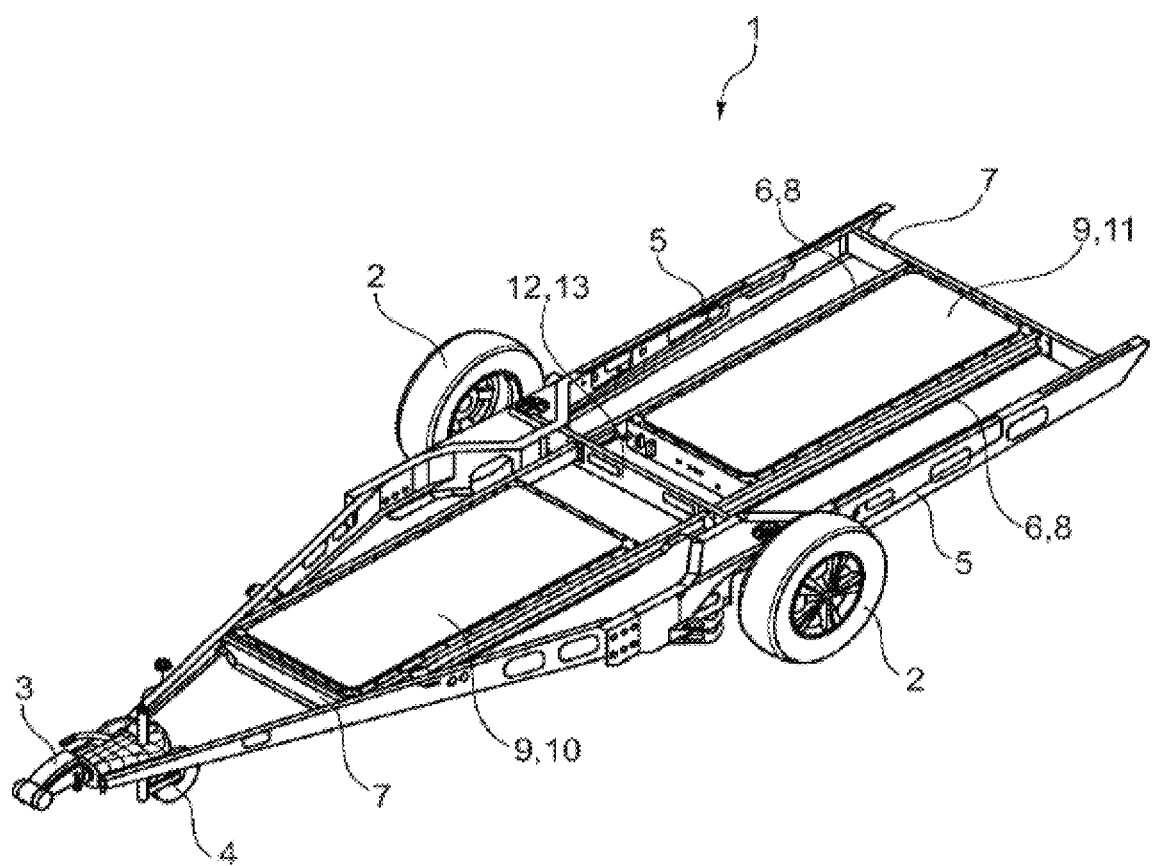
FIG. 1 is a schematic illustration of an exemplary travel trailer, according to embodiments shown and described herein.

Further advantages and details of the invention are explained in greater detail using the exemplary embodiment shown in the schematic figure. In this regard, the figure shows a vehicle frame 1 of a travel trailer according to the invention, having the wheels 2 and a coupling head 3 as well as a support wheel 4. The vehicle frame 1 has longitudinal beams 5 that lie on the outside, between which inner beams 6 are arranged and connected, at their ends, with the longitudinal beams 5 that lie on the outside, using transverse beams 7, forming an inner frame 8. A battery 9 is arranged within the inner beams 6, which battery is divided up into a front battery 10 and a rear battery 11, between which a transverse beam 12 is arranged as an axle 13.

Not shown here, a floor of the travel trailer lies directly on the vehicle frame 1. It is advantageous that due to the low-lying battery 9, the center of gravity is displaced downward. For example, a support load on the coupling head 3 when the travel trailer is not loaded can be established by means of the precise position of the front battery 10 and the rear battery 11 with reference to the axle 13. In the event of an accident, the longitudinal beams 5 that lie on the outside and their distance from the inner beams 6 protect the battery 9 from rapid and severe damage.

Figure 2:
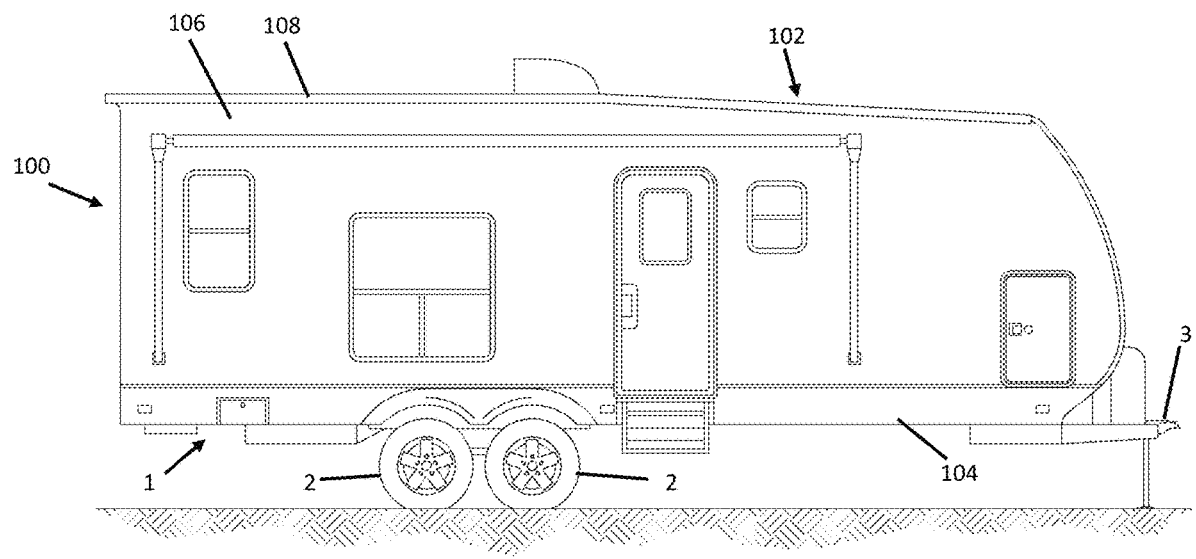
FIG. 2 is another schematic illustration of an exemplary travel trailer depicting walls of an interior, according to embodiments shown and described herein.

FIG. 2 depicts a travel trailer 100 with the vehicle frame 1 described herein. The travel trailer 100 may include an interior 102 that is supported by a floor 104 of the interior 102. The interior 102 may be defined by walls 106 and a roof 108. The floor 104 is designed to support standing and walking persons within the interior 102.

The invention claimed is:

1. A travel trailer comprising an interior, a floor of the interior that is designed to support standing and walking persons, a vehicle frame, a front battery, and a rear battery, wherein:
   the floor of the interior lies on the vehicle frame;
   the vehicle frame comprises a coupling head, wheels, an axle, longitudinal beams, inner beams, and transverse beams;
   the longitudinal beams lie on the outside of the vehicle frame;
   the inner beams are arranged between and are spaced from the longitudinal beams;
   two of the transverse beams connect ends of the longitudinal beams to ends of the inner beams to form an inner frame; and
   the front battery, the rear battery, and the axle are arranged along a common plane within the inner beams of the inner frame, on opposite sides of the axle, such that a spacing between the longitudinal beams that lie on the outside of the vehicle frame and the inner beams of the inner frame protects the front battery and the rear battery from damage.

2. The travel trailer of claim 1, wherein the axle comprises a torsion tube.

3. The travel trailer of claim 1, wherein the front battery and the rear battery are symmetrically positioned distribute weight about the axle.

4. The travel trailer of claim 1, wherein a height of the inner frame generally corresponds to a height of the front battery and the rear battery.

5. The travel trailer of claim 1, wherein the front battery or the rear battery supply electricity to a travel drive of a towing vehicle.

6. The travel trailer of claim 1, wherein the front battery or the rear battery supply electricity to a travel drive of the travel trailer.

7. The travel trailer of claim 1, wherein the front battery or the rear battery supply electricity to a travel drive of a towing vehicle or a travel drive of the travel trailer.

8. The travel trailer of claim 1, wherein the inner beams abut the front battery and the rear battery.

9. The travel trailer of claim 1, wherein the inner frame abuts the front battery and the rear battery.

10. A travel trailer comprising an interior, a floor of the interior that is designed to support standing and walking persons, a vehicle frame, a front battery, and a rear battery, wherein:
    the floor of the interior lies on the vehicle frame;
    the vehicle frame comprises a coupling head, wheels, an axle, longitudinal beams, inner beams, and transverse beams;
    the longitudinal beams lie on the outside of the vehicle frame;
    the inner beams are arranged between and are spaced from the longitudinal beams;
    two of the transverse beams connect ends of the longitudinal beams to ends of the inner beams to form an inner frame; and
    the front battery, the rear battery, and the axle are arranged along a common plane within the inner beams of the inner frame, on opposite sides of the axle, such that a spacing between the longitudinal beams that lie on the outside of the vehicle frame and the inner beams of the inner frame protects the front battery and the rear battery from damage, wherein:
    the front battery and the rear battery are symmetrically positioned distribute weight about the axle; and
    a height of the inner frame generally corresponds to a height of the front battery and the rear battery.

11. The travel trailer of claim 10, wherein the axle comprises a torsion tube.

12. The travel trailer of claim 11, wherein the inner frame abuts the front battery and the rear battery.

13. The travel trailer of claim 10, wherein the front battery or the rear battery supply electricity to a travel drive of a towing vehicle.

14. The travel trailer of claim 10, wherein the front battery or the rear battery supply electricity to a travel drive of the travel trailer.

15. The travel trailer of claim 10, wherein the front battery or the rear battery supply electricity to a travel drive of a towing vehicle or a travel drive of the travel trailer.

16. The travel trailer of claim 10, wherein the inner beams abut the front battery and the rear battery.

17. A travel trailer comprising an interior, a floor of the interior that is designed to support standing and walking persons, a vehicle frame, a front battery, and a rear battery, wherein:
    the floor of the interior lies on the vehicle frame;
    the vehicle frame comprises a coupling head, wheels, an axle, longitudinal beams, inner beams, and transverse beams;
    the longitudinal beams lie on the outside of the vehicle frame;
    the inner beams are arranged between and are spaced from the longitudinal beams;
    two of the transverse beams connect ends of the longitudinal beams to ends of the inner beams to form an inner frame; and
    the front battery, the rear battery, and the axle are arranged along a common plane within the inner beams of the inner frame, on opposite sides of the axle, such that a spacing between the longitudinal beams that lie on the outside of the vehicle frame and the inner beams of the inner frame protects the front battery and the rear battery from damage, wherein:
    the front battery and the rear battery are symmetrically positioned distribute weight about the axle;

the front battery or the rear battery supply electricity to a travel drive of a towing vehicle or a travel drive of the travel trailer;

the inner frame abuts the front battery and the rear battery; and a height of the inner frame generally corresponds to a height of the front battery and the rear battery.

18. The travel trailer of claim 17, wherein the axle comprises a torsion tube.

* * * * *